United States Patent Office 2,730,914
Patented Jan. 17, 1956

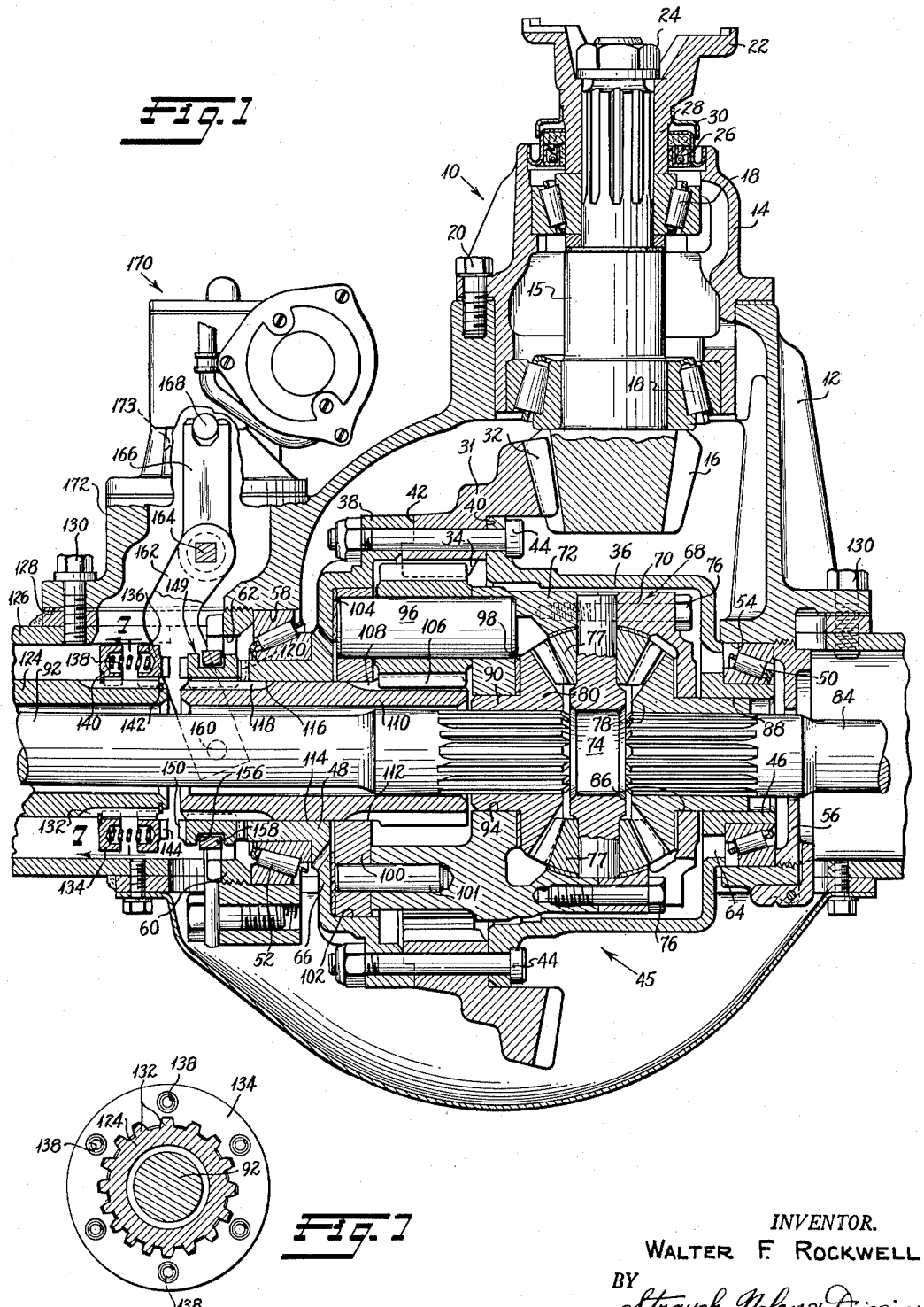

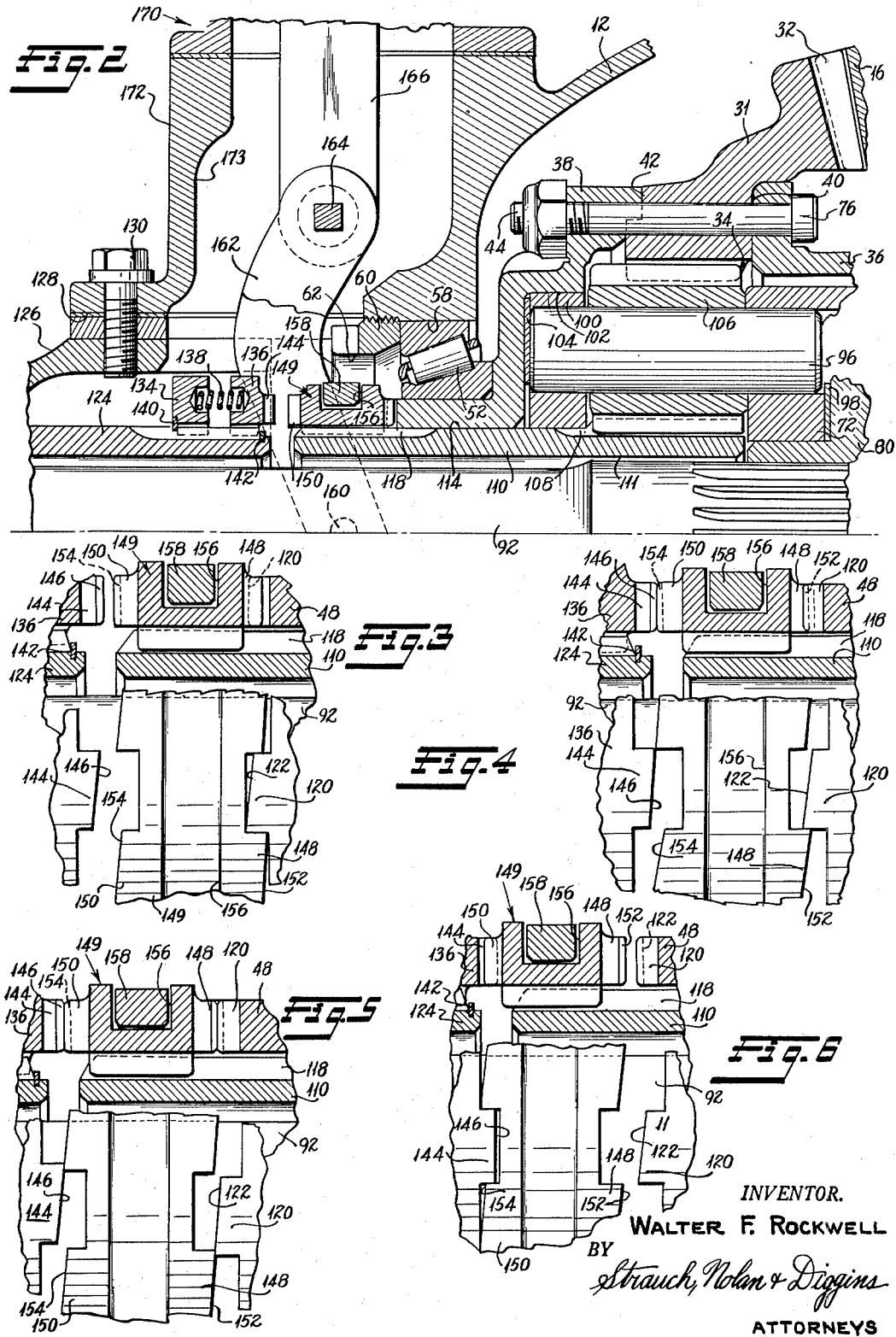

---

2,730,914

MULTI-SPEED PLANETARY VEHICLE DRIVE MECHANISM

Walter F. Rockwell, Detroit, Mich., assignor to The Rockwell Spring and Axle Company, Coraopolis, Pa., a corporation of Pennsylvania Application December 17, 1953, Serial No. 398,770

7 Claims. (Cl. 74—695)

This invention relates to vehicle drive mechanisms, and more particularly to selectively shiftable multi-speed planetary drive axles.

It is the primary purpose of this invention to provide an automatically power shifted multi-speed transmission for vehicles drive axles for multiplying the drive ratios available through the drive axles without the necessity of declutching the conventional vehicle drive transmission. Transmissions of this type have been heretofore proposed and constantly improved in attempts to attain facility and smoothness of shifting while maintaining a high degree of responsiveness to shifting.

United States Letter Patent to N. R. Brownyer No. 2,516,850 discloses a multi-speed planetary type drive axle which represents a considerable advance toward providing a vehicle with additional drive ratios without the necessity of declutching the conventional vehicle transmission. The present invention provides certain improved details of construction over the Brownyer patent to provide a planetary drive axle that is simple, compact, and inexpensive to manufacture and which results in the aforementioned ease and smoothness of operation while maintaining a high degree of response to shifting operations.

It is therefore a major object of this invention to provide an improved planetary drive axle for vehicles.

A further object of this invention is to provide an improved two speed planetary drive axle for vehicles with a selectively shiftable light clutch and brake collar having no neutral position.

Still another object of this invention is to provide a two speed planetary drive axle wherein the differential cage supports the planetary gears and is relatively rotatable with respect to the ring gear and sun gear and a light clutch and brake collar is selectively shiftable on the sun gear between direct and planetary drive positions with no intermediate neutral position, to alternately prevent and permit relative rotation of the carrier.

An additional object of this invention is to provide a planetary drive axle with a light clutch and brake collar selectively shiftable on the sun gear to engage a complementary rotating clutch member integrally formed on a rotating housing fixed to the ring gear and a stationary resiliently mounted non-rotating brake member to alternately prevent and permit relative rotation of the ring gear and sun gear to connect the vehicle drive axle in direct and planetary drive ratios.

It is a further object of this invention to provide a simple, inexpensive, highly responsive, smoothly operating shift mechanism for multi-speed planetary drive axles.

These and other objects will become apparent from the following description and appended claims when read in connection with the attached drawings, wherein:

Figure 1 is a horizontal section of a preferred embodiment of the present invention;

Figure 2 is an enlarged fragmentary section of the novel shift mechanism of this invention;

Figures 3 through 6 are fragmentary elevational views showing the sequence of movement of the clutch brake collar from one drive condition to the other; and Figure 7 is a sectional view taken substantially along line 7—7 of Figure 1.

Turning now to the drawing and particularly to Figure 1, the two speed planetary drive axle, generally indicated 10, comprises a housing 12 on the forward portion of which a bearing cage 14 rotatably mounts an engine driven shaft 15 having an integral bevel or hypoid input pinion 16 on spaced antifriction bearings 18, cage 14 being mounted on housing 12 as by bolts 20. Splined to the outer or forward end of shaft 15 is a flange coupling 22 which provides a driving connection to an engine driven propeller shaft (not shown), coupling 22 being retained on shaft 15 by nut 24 threadedly engaging the outermost or exterior end thereof.

Seal 26 is mounted in coacting engagement with the periphery of integral hub 28 of flange 22 and an inner periphery of bearing cage 14 in the conventional manner as shown in Figure 1 to prevent fluid leakage therebetween and is protected from foreign matter by dished baffle member 30 press fittedly mounted on hub 28 with its concave surface adjacent the exposed end of seal 26.

An annular drive member 31 is provided at its outer periphery with bevel or hypoid ring gear 32 which is in constant mesh with pinion 16, and at its inner periphery with internal ring gear 34, as shown in Figures 1 and 2. Drive member 31 is mounted between hollow housing members 36 and 38 with faces 40 and 42 of the drive member in abutting relation with adjacent faces of the housing members, and is held therebetween by a plurality of bolts 44 to form a unitary differential and planetary gear housing assembly, generally indicated 45. As shown in Figure 1, bevel gear portion 32 of drive member 31 is located exteriorly of housing 45 to mesh with pinion 16 as described while ring gear 34 is disposed internally of housing 45.

Housing members 36 and 38 are provided with oppositely extending hollow bosses 46 and 48, respectively, rotatably journalled in spaced tapered antifriction bearings 50 and 52 the inner races of which abut adjacent faces of the respective housing members. Bearing 50 is mounted in bore 54 in the right hand side of differential housing 12, as viewed in Figure 1, and is retained therein by threaded retaining member 56 threadedly mounted in bore 54 in abutting relation with the adjacent face of the outer race of bearing 50 while bearing 52 is mounted in left hand bore 58 of differential housing 12 and retained therein by threaded retaining member 60 mounted in bore 58. As shown in Figure 1, retaining member 60 is provided with a relatively large axial bore 62 for clearance purposes which will become apparent.

Suitable apertures 64 and 66 in housing members 36 and 38, respectively, assure the free flow of lubricating oil throughout the differential mechanism.

Rotatably mounted in housing assembly 45 is a rotatable differential cage, generally indicated 68, which comprises a pair of cage halves 70 and 72 held in clamping engagement against intermediately mounted differential spider 74 by means of a plurality of bolts 76 in the conventional manner. Each of the equiangularly spaced arms of spider 74 rotatably mount a bevel pinion 77 in constant mesh with both bevel side gears 78 and 80. The internally splined hub of bevel gear 78 which drivingly engages the inner splined end of axle shaft 84 is journalled in bores 86 and 88 of cage half 70 and boss 46, respectively; while internally splined hub 90 of bevel side gear 80, which drivingly engages the inner splined end of axle shaft 92, is journalled in bore 94 of cage half 72.

A plurality of planetary pinion spindles 96 are press fittedly received in circumferentially disposed bores in cage half 72 with an adjacent end in abutting relation with bronze thrust washer 98 disposed between the inner face of cage half 72 and an adjacent face of bevel side gear 80. The opposite end of spindles 96 are press fittedly received in axially aligned bores in a carrier ring 100 rotatably journalled in bore 102 of housing member 38 and fixed to cage half 72 by dowels 101. The left end of spindles 96, as viewed in Figure 1, are in bearing contact with thrust washer 104, preferably of bronze, disposed between carrier ring 100 and an adjacent inner wall of housing 38. Planetary pinions 106 are rotatably mounted on spindles 96 in constant meshing engagement with ring gear 34 and are also constantly in mesh with sun gear 108 integrally formed at one end of rotatable sleeve member 110 journalled, by means of intermediate journal portion 114, in axially aligned bores 112 and 116 of ring member 100 and boss 48, respectively. The opposite or left hand end of sleeve member 110, as viewed in Figure 1, is suitably splined as at 118. Rotatable sleeve member 110 is provided with internal bore 111, Fig. 2, concentric to and in spaced relation to the periphery of axle shaft 92, to permit non-interfering relative rotation therebetween as will become apparent.

The left hand end of boss 48, as viewed in Figure 1, is provided with axially extending clutch teeth 120 having inclined end surfaces 122 in the manner shown and described in application Serial No. 330,441, filed January 9, 1953, by C. E. Schou for Vehicle Drive Mechanism which constitutes an improved modification of the well known Maybach teeth more fully described in United States Letters Patents 2,049,126 and 2,049,127. Reference is made to such application for further detail if required.

Sleeve 124, which is mounted in concentric spaced relation to axle 92 similar to and in axially spaced alignment with sleeve 110, is fixed in non-rotative relation in axle tube or housing 126 by suitable means (not shown). Axle housing 126 is aligned within bore 128 of differential housing 12 and is held in non-rotative relation thereto by a plurality of bolts 130. The inner or right hand end of sleeve 124, as viewed in Figure 1, adjacent splines 118 of sleeve 110 is similarly splined as at 132. Spaced annular rings 134 and 136, internally splined for axially slidable non-rotative movement on splines 132, are provided at adjacent inner faces with a plurality of axially aligned circumferentially disposed bores for retaining the ends of coil compression springs 138. Springs 138 exert a biasing or separating force on rings 134 and 136 forcing them into abutting contact with snap rings 140 and 142, respectively, externally mounted on sleeve 124 to define the limits of axial separation of rings 134 and 136. The right hand face of ring 136 as viewed in Figure 1 is provided with circumferentially disposed axially extending brake teeth 144 having the well known inclined end surfaces 146, of the Maybach type clutch teeth heretofore referred to. It will be clearly seen from Figures 1 and 2 that the combined axial length of annular rings 134 and 136 disposed between snap rings 140 and 142 is less than the axial distance between these snap rings. As a result annular rings 134 and 136 are permitted limited resilient axial movement between the snap rings, for a purpose which will become apparent.

Intermediate teeth 120 and 144 and slidably mounted on splines 118 of sleeve 110 is a clutch and brake collar 149 having oppositely axially extending teeth 148 and 150 with flat inclined end faces 152 and 154, respectively, which are adapted to be selectively engaged with teeth 120 and 144 respectively. Collar 149 is provided with an external peripheral groove 156 which slidably bearingly receives semi-circular actuating ring 158 pivoted at diametrically opposite ends, as at 160, to adjacent ends of a shifter fork 162. The other end of shifter fork 162 is operatively connected as by square shaft 164 to one end of actuating link 166 the other end of which extends through opening 173 of boss 172 and is operatively connected to suitably selectively operated actuating mechanism generally designated 170, as at 168. Actuating mechanism 170 is mounted on forwardly extending boss 172 of differential housing 12 and lies in a plane substantially perpendicular to the axis of shaft 92 and to one side of the axis of rotation of pinion 16, as best seen in Figure 1, and is secured thereon by suitable means (not shown). This actuating mechanism may be of the type and controlled in the manner illustrated in United States Patent No. 2,462,779, issued February 22, 1949, for Gear Shifting Mechanism.

As heretofore noted collar 149 is selectively shiftable so that teeth 148 may be engaged with teeth 120 which is the direct or high speed drive condition of the drive axle, and teeth 150 may be selectively engaged with teeth 144, which is the planetary or low speed drive condition of the drive axle. For ease of explanation the operation of the gearing mechanism in the two drive speed conditions will first be explained and then the shifting sequence of the collar 149 and the means for effecting shifting of the collar will then be explained.

As illustrated in Figure 1 with clutch teeth 148 of collar 149 in driving engagement with clutch teeth 120 of housing member 38 there is established the direct or high speed drive condition of the drive axle wherein driving torque from an engine driven propeller shaft (not shown) is transmitted through pinion 16 and drive gear 32 directly to differential cage 68. Direct drive is established, since collar 149 in the position illustrated in Figure 1, effectively rigidly interconnects housing member 38 and sleeve 110 so that there is no relative rotation therebetween and planetary pinions 106 are prevented from rotating on their own axes. As a result, sun gear 108, planetary gears 106, and ring gear 34 are rigidly interconnected and will rotate as a unit about the axis of rotation of the vehicle drive axles. Since housing member 72 of differential cage 68 forms one portion of the planetary gear carrier mechanism for planetary gears 106, rotation of planetary gears 106 about the axis of axles 92 will be imparted to differential cage 68 and direct drive will be thereby transmitted from the engine driven propeller shaft to the differential cage 68 and will be transmitted therefrom through the differential gears in the well known manner to axle shafts 84 and 92.

With collar 149 shifted to the left as viewed in Figures 1 and 6 so that teeth 150 are in driving engagement with teeth 144 of non-rotatable brake ring 136, there is established the low speed or underdrive condition of the transmission. In this drive condition, sleeve 110 is fixed through collar 149 to stationary sleeve 124 in a non-rotative relation with respect to housing 12. Rotation of pinion 16 and consequent rotation of drive gear 32 is imparted to housings 36 and 38 through ring gear 34. Rotation of ring gear 34 is imparted to planet gears 106 causing the planet gears to rotate about their own axes as well as moving about the axis of axle shaft 92, since sun gear 108 is held in fixed relation with respect to housing 12. The rotation of spindles 96 on their own axis as well as about the axis of axle 92 results in a reduction in speed from the rotational speed of ring gear 34 which reduced speed is imparted to cage half 72 fixed to spindles 96 to cause differential carrier 68 to rotate at a lower speed than ring gear 34. The lower speed rotation of differential carrier 68 is imparted to axles 84 and 92 through the differential bevel gears in the well known manner to drive the vehicle at low speed.

It will be seen from the foregoing that there is herein provided a novel two speed planetary transmission for differential vehicle drive axles wherein the vehicle can be driven at a direct drive, or relatively high speed condition, and at an underdrive, or relatively low speed drive condition.

It should be noted here that collar 149 in shifting from driving engagement with clutch teeth 120 to driving engagement with brake teeth 144 does not pass through a neutral position, and that that position illustrated by Figure 5 is merely a transition position between driving engagement with one set of teeth to driving engagement with the other set of teeth. This elimination of a neutral position between the two drive conditions permits quick response to shifting signals so that vehicle transmission can be shifted from one position to the other without any substantial lost motion or delay to thus maintain complete operator control of the vehicle drive conditions at all times.

In order to shift from the direct drive condition illustrated in Figures 1, 2 and 3 to the underdrive condition illustrated in Figure 6, the operator actuates actuating mechanism 170 through suitable means (not shown) to preselect the underdrive condition. After preselecting the underdrive condition, the operator lets up on the vehicle accelerator which reduces the driving torque engagement between teeth 120 and 148 and collar 149 is shifted to the left, as viewed in Figure 1, by actuating mechanism 170 out of engagement with clutch teeth 120 and is progressively moved toward the left toward engagement with brake teeth 144 as illustrated in Figures 4 and 5. Since collar 149 was rotating in the direct drive condition with sleeve 110 and housing assembly 45 the speed of collar 149 is not synchronized with brake ring 136, and will not mesh therewith, but must first come to a stop before intermeshing is possible. During this relative rotation of collar 149 and brake ring 136 which exists while collar 149 is in the transition position illustrated by Figure 5 the inclined ends 154 of teeth 150 will ratchet past the inclined ends 146 of teeth 144. The axial movement between ring 136 and collar 149 required for this ratcheting is permitted by coil compression springs 138 which permit limited axial displacement of brake ring 136 to the left as viewed in Figure 1 to permit the ratcheting of the teeth past each other. The ratcheting effect of collar 149 and brake ring 136 is more fully described in copending application Serial No. 330,441 to which reference is made for further details. In order to stop rotation of collar 149 to permit smooth engagement of the collar with ring 136 once collar 149 has passed from direct drive condition illustrated in Figure 1 to the transition position illustrated in Figure 5 the operator again depresses the accelerator which causes the engine to increase in speed. The increase in engine speed will cause ring gear 34 to speed up and cause sun gear 108 to slow down to a stop through intermediate rotating planetary gears 106, and consequently a stopping in the rotation of collar 149. When collar 149 has come to a complete stop it will under the influence of shifter fork 162 be fully moved to the left into engagement with brake ring 136. Engagement of collar 149 and ring 136 will also result in slight rightward movement of brake ring 136 under the influence of coil compression springs 138 to form a complete meshing engagement between collar 149 and stationary brake ring 136, to thereby maintain collar 149 stationary with respect to rotatable housing 45, which establishes the low speed or underdrive condition, heretofore described.

The axially extending faces intersecting the high ends of the inclined end surfaces of teeth 144 and 150 engage to prevent reverse relative rotation of collar 149 relative to brake ring 136 and clutch teeth 120 of housing member 38 so that positive engagement of collar 149 and brake ring 136 is always assured when these members are at synchronized speeds, as more fully described in copending application Serial No. 330,441.

Shifting from the underdrive or low speed drive condition illustrated in Figure 6 to the direct drive condition illustrated in Figure 1 is essentially the same as the foregoing. The operator once again actuates actuator mechanism 170 to preselect a direct drive condition after which the operator releases the vehicle accelerator to reduce driving torque engagement between teeth 150 and 144 to permit movement of collar 149 to the right under the influence of shifter fork 162. Clutch and brake collar 149 again passes through the transition state illustrated in Figure 5 where the teeth of collar 149 are ratcheting past teeth 144 of brake ring 136 and teeth 120 of housing member 38, as heretofore described. When the operator allows the engine to slow down, rotation of housing 45 will decrease until collar 149 and teeth 120 of housing 38 are synchronized to permit collar 149 to slip into driving engagement with teeth 120 and thus establish the direct drive condition of the planetary transmission.

If after preselecting the direct drive condition and letting up on the accelerator, the operator should again depress the accelerator and increase the engine speed before teeth 120 and 148 are in driving engagement the transmission will automatically slip back from the transition stage to the underdrive condition, wherein the side faces of the high points of teeth 150 will partially engage the high points of teeth 144 of brake ring 136. Also if the actuator should be inadvertently reversed, after being actuated for shifting to direct drive, to call for an underdrive condition when the collar 149 is in the transition stage from underdrive to direct drive the collar 149 will move back to the underdrive condition in full engagement with brake ring 136 when it has slowed down to no rotation. However once teeth 148 are fully engaged with teeth 120, of housing 38, any acceleration of the vehicle engine and/or reversal of the actuator 170 will not cause slippage from the direct drive condition back to underdrive since the frictional engagement of teeth 120 and 148 will be sufficient to prevent disengagement of these teeth. Thus overspeeding of collar 149 is effectively prevented by providing slippage to underdrive upon premature acceleration during a transition state or inadvertent reversal of actuator 170, and consequent possible damage to the mechanism is effectively prevented.

From the foregoing description it will be readily appreciated that there is herein provided an improved shift mechanism for a two speed planetary drive axle wherein the shifting mechanism assures a high degree of response to shift signals to effect rapid shifting from one drive condition to the other with ease and smoothness of shifting and by means of a shifter mechanism that is inexpensive, compact and light in weight. There is also herein provided novel means wherein inadvertent overspeeding of the clutch and brake collar 149 when moving from one drive condition to another is effectively prevented to prevent any damage to the shift mechanism.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by United States Letters Patent is:

1. A multi-speed drive axle comprising, a housing, a planetary gear casing rotatably mounted in said housing; a ring gear fixedly secured to said casing and rotatable therewith; a carrier for a differential drive mechanism rotatably mounted in said casing, a plurality of planetary gears rotatably supported by said carrier in constant mesh with said ring gear; input means operatively connected to said ring gear for imparting driving torque thereto; a sun gear rotatably mounted in said casing in constant mesh with said planetary gears; axially extending inclined end surface clutch teeth integrally formed on one end of said casing; a sleeve fixedly mounted in said housing in spaced axial alignment with said sun gear; a pair of elements non-rotatably mounted for limited axial movement of at least one of said elements on said sleeve; axially facing inclined end surface brake teeth on said one element in spaced relation to said clutch teeth; a clutch and brake collar mounted for rotation with said sun gear selectively axially displaceable relative to said sun gear into alternative engagement with said clutch and brake teeth and having axially facing inclined end surface teeth on opposite sides adapted to ratchet past said clutch and brake teeth in one direction of rotation prior to meshing therewith to define different speed ratios between said input means and differential mechanism; and resilient means operatively interposed between said elements permitting limited axial movement of said brake teeth during said ratcheting until said collar and teeth are meshed.

2. The device as set forth in claim 1 wherein said elements comprise a pair of annular rings slidably splined on said sleeve; spaced restraining means operatively retaining said annular rings on said sleeve and permitting limited relative sliding movement of said rings relative to said sleeve; and a plurality of springs operatively interposed between said rings normally biasing said rings into engagement with said restraining means and permitting limited axial movement of said brake teeth during said ratcheting prior to selective meshing of said collar and teeth.

3. In a planetary drive mechanism having a rotatable ring gear, and relatively rotatable planetary gears and a sun gear intermeshed therewith, speed ratio selecting comprising means fixedly secured to and rotatable with said ring gear having axially extending inclined end surface clutch teeth, a sleeve axially spaced from said sun gear and fixed against rotation, means non-rotatably mounted on said sleeve in spaced relation to said means having axially extending inclined end surface brake teeth; a clutch and brake collar rotatable with said sun gear operatively interposed between said clutch and brake teeth and selectively axially displaceable relative to said sun gear into alternative engagement with said brake and clutch teeth to alternately permit and prevent relative rotation of said ring gear and sun gear and having axially extending inclined end surface teeth on opposite sides adapted to ratchet past said teeth prior to meshing therewith; and resilient means backing said brake tooth mounting means permitting limited axial displacement thereof during said ratcheting prior to meshing of said teeth.

4. The device as set forth in claim 3 wherein said brake tooth mounting means comprises a pair of annular rings slidably splined on said sleeve for limited axial movement of at least one of said rings relative thereto, said teeth being formed on said one ring to provide said brake teeth; and spring means operatively interposed between said rings permitting limited axial movement of said one ring during said ratcheting.

5. In a two speed transmission, two axially spaced relatively rotatable members each associated with a different speed ratio mechanism in said transmission and each having a row of teeth extending toward the other, a relatively rotatable element disposed between said members and having on opposite sides rows of teeth extending toward the adjacent member, means mounting said element for shift between one selective speed ratio position where said element has the teeth on one side meshed in torque transmitting engagement with the teeth of the adjacent one of said members and a second selective speed ratio position where said element has the teeth on its other side meshed in torque transmitting engagement with the teeth of the other of said members, means for shifting said element in opposite directions toward one or the other of said positions, said teeth on the said members and element all having axially directed faces which are inclined at an acute angle and in the same direction with respect to the axis of rotation of said members and element, one of said members comprising a ring and the teeth thereof serving as brake teeth, a support, slidable spline means mounting said brake tooth ring on said support for limited axial displacement from a normal position corresponding to that it occupies in its selective speed ratio position, a first stop on said support on the side of said ring opposite said element, resilient means interposed between said first stop and said ring for permitting such displacement and constantly urging return of said brake tooth ring to said normal position, and a second stop on said support limiting return of said brake tooth ring to said normal position.

6. In a two speed transmission, two axially spaced relatively rotatable members each associated with a different speed ratio mechanism in said transmission and each having a row of teeth extending toward the other, a relatively rotatable collar disposed between said members and having on opposite sides rows of teeth extending toward the adjacent member, means mounting said collar for shift between one selective speed ratio position where said collar has the teeth on one side meshed in torque transmitting engagement with the teeth of the adjacent one of said members and a second selective speed ratio position where said collar has the teeth on its other side meshed in torque transmitting engagement with the teeth of the other of said members, means for shifting said collar in opposite directions toward one or the other of said positions, said teeth on the said members and collar all having axially directed faces which are inclined at an acute angle and in the same direction with respect to the axis of rotation of said members and collar, a fixed sleeve coaxial with said collar and having a splined end, coacting internal spline means mounting one of said members for limited axial displacement from a normal position corresponding to that it occupies in its selective speed ratio position, a stop on said sleeve on the side of said one member opposite said collar, and resilient means between said one member and said stop for permitting such displacement and constantly urging return of said one member to said normal position.

7. In combination in a planetary two speed axle, an axle housing, a planetary gearing enclosing casing rotatably mounted in said axle housing, a rotatable ring gear, a coaxial rotatable sun gear and interposed planet gears meshed with both the sun gear and ring gears all within said casing, a hub on said sun gear projecting through said casing and having external splines at the end opposite said sun gear, said hub being journaled on the casing intermediate said splines and said sun gear, a row of axially extending clutch teeth on said casing coaxial with said sun gear hub, means rigid with the axle housing slidably supporting a ring having a row of brake tooth that are coaxial with and substantially on the same diameter as said clutch teeth, a clutch and brake collar non-rotatably and slidably mounted on said sun gear hub splines, said collar having on opposite sides rows of teeth extending toward the brake and clutch teeth respectively, means for shifting said collar in opposite direction into toothed mesh with either said clutch or brake teeth, said teeth all having axially directed faces which are inclined at the same angle and in the same direction with respect to the axis of rotation of said sun gear, resilient means backing said brake ring and urging it toward its normal meshed position with said collar, and a stop limiting movement of said brake ring toward said collar to said normal position.

References Cited in the file of this patent

UNITED STATES PATENTS

| | | |
|---|---|---|
| 1,664,575 | Staples | Apr. 3, 1928 |
| 1,703,846 | Jackson | Feb. 26, 1929 |
| 1,706,551 | Starr | Mar. 26, 1929 |
| 1,815,688 | Wiedmaier | July 21, 1931 |
| 2,046,282 | Wert | June 30, 1936 |
| 2,071,165 | Harper | Feb. 16, 1937 |
| 2,120,831 | Cotterman | June 14, 1938 |
| 2,178,900 | Starr | Nov. 7, 1939 |
| 2,384,448 | Banker | Sept. 11, 1945 |

FOREIGN PATENTS

| | | |
|---|---|---|
| 1,018,010 | France | Oct. 8, 1952 |